United States Patent
Drummond et al.

(10) Patent No.: US 6,697,265 B2
(45) Date of Patent: Feb. 24, 2004

(54) WIDE RANGE DC POWER SUPPLY UTILIZING VOLTAGE DOUBLING OUTPUT CAPACITORS AND INDUCTIVE CHOKE TO EXTEND FULL POWER LOAD IMPEDANCE RANGE

(75) Inventors: Geoffrey N. Drummond, Fort Collins, CO (US); Bryce L. Hesterman, Fort Collins, CO (US)

(73) Assignee: Advanced Energy Industries, Inc., Fort Collins, CO (US)

( * ) Notice: Subject to any disclaimer, the term of this patent is extended or adjusted under 35 U.S.C. 154(b) by 32 days.

(21) Appl. No.: 09/863,678

(22) Filed: May 23, 2001

(65) Prior Publication Data

US 2003/0007366 A1 Jan. 9, 2003

(51) Int. Cl.$^7$ .............................................. H02M 3/335
(52) U.S. Cl. ........................................... 363/17; 363/48
(58) Field of Search ............................. 363/17, 44, 45, 363/47, 48

(56) References Cited

U.S. PATENT DOCUMENTS

| | | | | |
|---|---|---|---|---|
| 3,911,324 A | * | 10/1975 | Bishop | |
| 4,555,751 A | * | 11/1985 | Koga et al. | 363/44 |
| 4,686,619 A | * | 8/1987 | Edwards | 363/48 |
| 4,831,508 A | * | 5/1989 | Hunter | 363/48 |
| 4,855,890 A | * | 8/1989 | Kammiller | 363/44 |
| 5,422,804 A | * | 6/1995 | Clark | 363/44 |
| 5,535,906 A | * | 7/1996 | Drummond | 216/67 |
| 5,874,788 A | * | 2/1999 | McCartney | 307/66 |
| 6,212,083 B1 | * | 4/2001 | Sakakibara | 363/126 |

* cited by examiner

*Primary Examiner*—Jeffrey Sterrett
(74) *Attorney, Agent, or Firm*—Benjamin Hudson, Jr.

(57) ABSTRACT

There is provided by this invention a dc power supply that utilizes capacitors in parallel with the diodes of the rectifier bridge in order to increase the full-power load impedance range of the power supply. In addition it has the capability to selectively couple the capacitors to the diodes over a predetermined frequency. This invention applies to both single phase and multiphase converters.

11 Claims, 7 Drawing Sheets

WIDE RANGE DC POWER SUPPLY UTILIZING VOLTAGE DOUBLING OUTPUT CAPACITORS AND INDUCTIVE CHOKE TO EXTEND FULL POWER LOAD IMPEDANCE RANGE

BACKGROUND OF THE INVENTION

1. Field of the Invention

This invention relates generally to power conversion apparatus utilizing resonant dc converter topology for dc power supplies, and more particularly, to dc power supplies utilizing resonant dc converter topologies that provide a wide load range at full power for application to plasma processing.

2. Brief Description of the Prior Art

Figure 6:
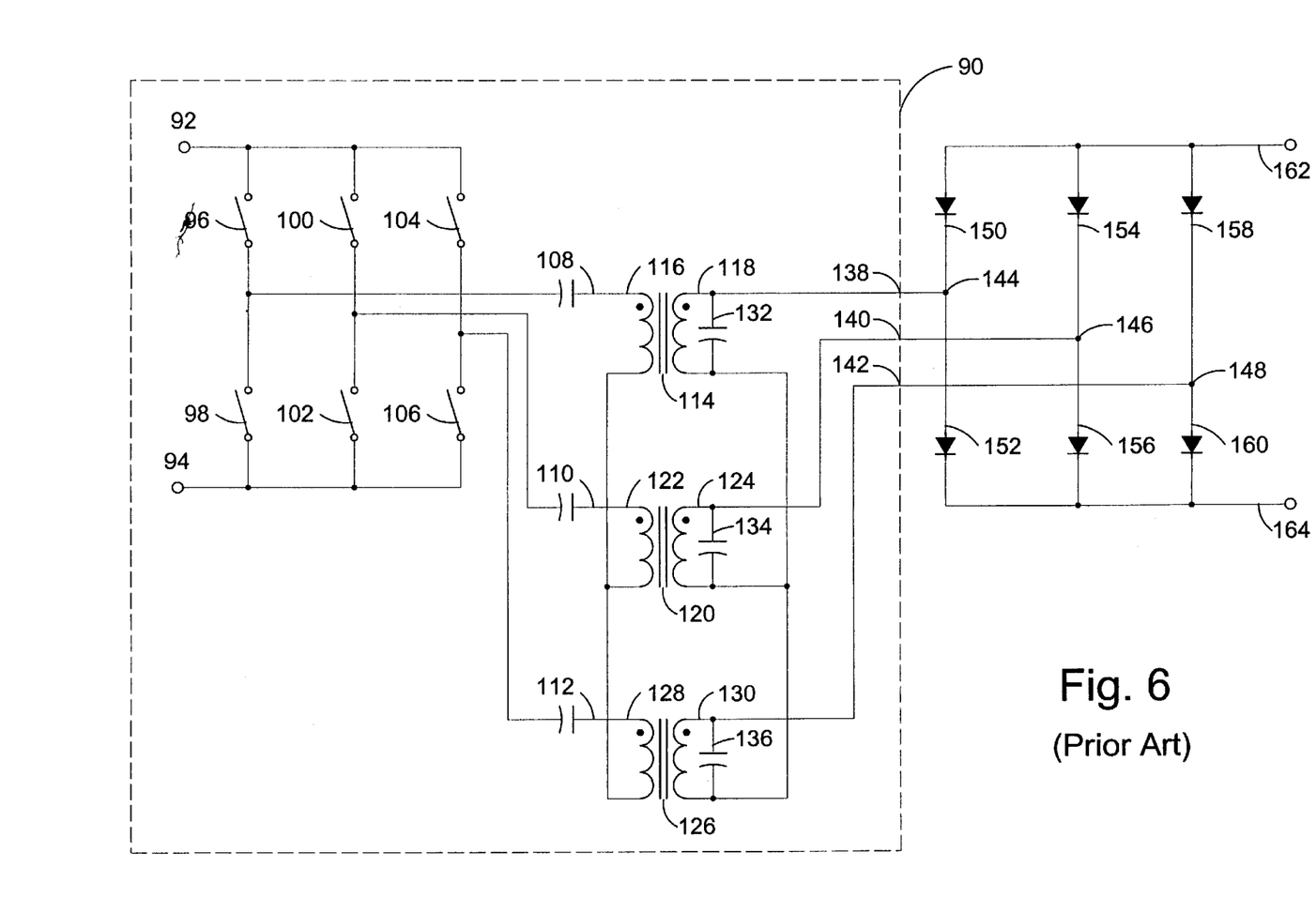
FIG. 6 illustrates a prior-art three-phase dc-dc power supply.

DC power supplies have found wide spread use in plasma processing applications such as plasma sputter deposition of thin films. It is advantageous if the power supply is able to deliver maximum power to the plasma over as wide a range of plasma load impedances as possible. U.S. Pat. No. 5,535,906 issued to Geoffrey N. Drummond assigned to the assignee of the instant application that teaches a multiphase L-C-C resonant power supply for plasma loads. A simplified schematic diagram of a converter following the teachings of U.S. Pat. No. 5,535,906 is shown in FIG. 6. This type of power supply can typically deliver full-power over about a 4:1 range of load impedances, but the range of load impedances that may be presented by plasma loads at given power level may be much greater. Consequently, several models of a power supply may be required to accommodate the range of plasma load impedances. There has been a long-felt need for a power supply which can provide full power over a broad range of load impedances to consolidate the number of power supply models that are required to operate various plasma loads.

The full-power output impedance range of a power supply is primarily determined by losses in the components. The losses in a resonant power supply for a given output power level and a given dc supply voltage are inversely related to the power factor seen by the inverter switches. In FIG. 6, switches 96, 98, 100, 103, 104 and 106 represent electronic switches such as field-effect transistors (FETs). Each switch may also include diodes connected to prevent current from flowing in the body diodes of the FETs. The power factor seen by the inverter switches may be defined as the cosine of the phase angle between the fundamental component of the square-wave voltage produced by a pair of switches (e.g. 96 and 98), and the fundamental component of the current flowing out of the node where the switches are connected to each other (e.g. the current through capacitor 108.)

There is an optimal load resistance for which the power factor is closest to unity. The power factor is reduced as the load resistance varies from the optimal value. This effect is plotted in FIG. 9 for an implementation of the prior-art power supply of FIG. 6, and also for embodiments of the present invention. Modifying a power supply circuit so that the range of load impedances for which the inverter power factor is relatively high is broadened increases the full-power impedance range of the power supply.

Figure 3:
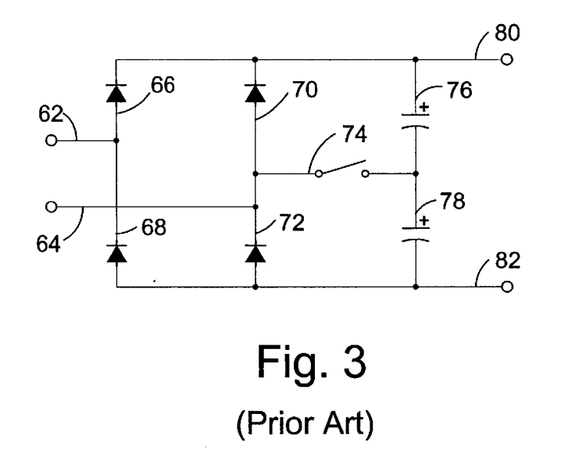
FIG. 3 illustrates a prior-art rectifier circuit incorporating capacitors to double the output voltage.

U.S. Pat. No. 5,874,788 issued to Thomas McCartney teaches the use of a rectifier circuit at input of ac-dc power supplies that can be switched between normal and voltage-doubling modes in order to broaden the range of ac mains voltages for which the power supply can properly operate. A pair of series-connected capacitors 76 and 78 are connected between dc output terminals 80 and 82 of a bridge rectifier consisting of diodes 66, 68, 70 and 72, as illustrated in FIG. 3. Switch 74 allows the circuit to be adapted to differing ac input voltages applied between ac input terminals 62 and 64. When switch 74 is open, the dc voltage between output terminals 80 and 82 is approximately equal to the amplitude (peak value) of the ac mains voltage. Closing switch 74 approximately doubles the dc voltage between output terminals 80 and 82. Switch 74 is closed for a 120 volt ac input voltage and open for 240 volts ac. Consequently, the voltage between the dc output terminals remains relatively constant for both 120 volt and 240 volt ac mains voltages. The values of capacitors 76 and 78 are selected to be large enough so that the voltage-doubling function is achieved over the intended range of load resistances.

SUMMARY OF THE INVENTION

It is an object of this invention to provide a resonant dc power supply that has a wide output impedance range. It is also an object of this invention to provide a wide range dc power supply that utilizes passive networks with a minimum number of parts and has low cost. In furtherance of these objects, there is provided a novel dc power supply design that utilizes a capacitive network that modifies the output range of conventional converter topologies wherein load impedance, converter frequency and output interactions provide high inverter power factors and low circuit losses over load impedance ranges as high as 64:1. Selectively doubling the output voltage electronically with capacitors for high impedance loads or halving it electronically for low impedance loads with an inductive choke can extend the full power load impedance range of a power supply as taught herein.

Both single-phase and multiphase circuits are taught that place capacitors in parallel with rectifying diodes wherein the capacitors have little effect for low values of load resistance.

BRIEF DESCRIPTION OF THE PREFERRED EMBODIMENTS

Figure 1:
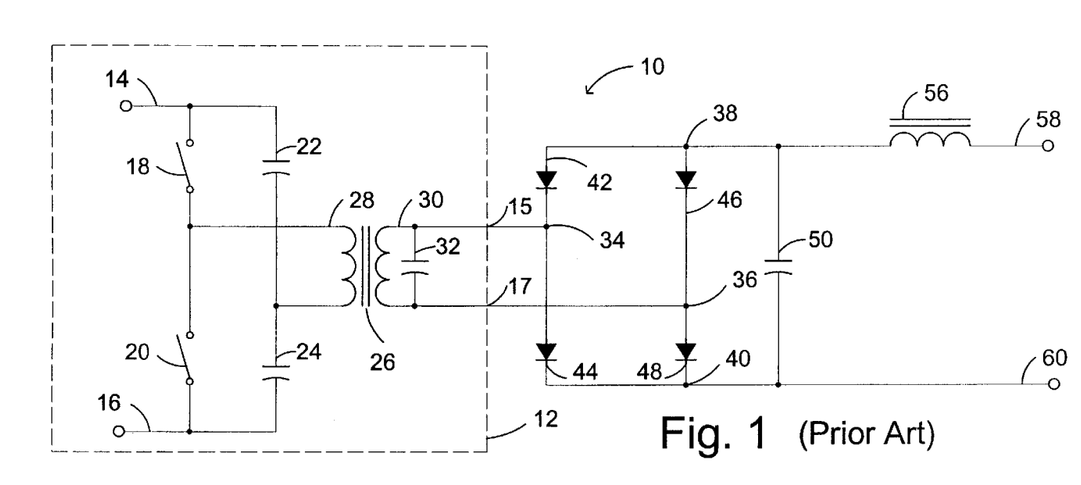
FIG. 1 illustrates a prior art standard resonant converter circuit.

Referring to FIG. 1 there is shown a dc power supply 10 that incorporates an inverter circuit 12. Power supply inverter sections that convert dc input power into an ac output at some predetermined frequency are well known to those skilled in the art and may be comprised of a variety of topologies. A typical inverter section such as 12 is shown that includes dc input terminals 14 and 16 for receiving dc input power and ac output terminals 15 and 17. Switches 18 and 20 operate alternately during one complete switching cycle. The switching actions generate an alternating voltage across primary winding 28 of a transformer 26. Transformer 26 is a high-frequency ac transformer designed to operate at the switching rates of switches 18 and 20. The leakage inductance between the primary and secondary windings provides the resonant inductance in a classic L-C-C resonant topology. Capacitors 22 and 24 each having a value C will act as an equivalent capacitor having a value 2C at the ac switch frequencies with respect to the current flowing primary winding 28. This equivalent capacitance is the series capacitor in a classic L-C-C resonant topology. Capacitor 32 across the secondary 30 of the transformer is the parallel capacitor of the circuit. This is the parallel capacitor in a classic L-C-C resonant topology. AC input terminals 34 and 36 of a full bridge rectifier consisting of diodes 42, 44, 46, and 48 are connected to inverter ac output terminals 15 and 17 to provide a dc voltage between rectifier output terminals 38 and 40. A low-pass filter consisting of a capacitor 50 and an inductor 56 provide a filtered dc voltage at output terminals 58 and 60. This power supply circuit can supply full power over an impedance range of 4:1.

Figure 2:
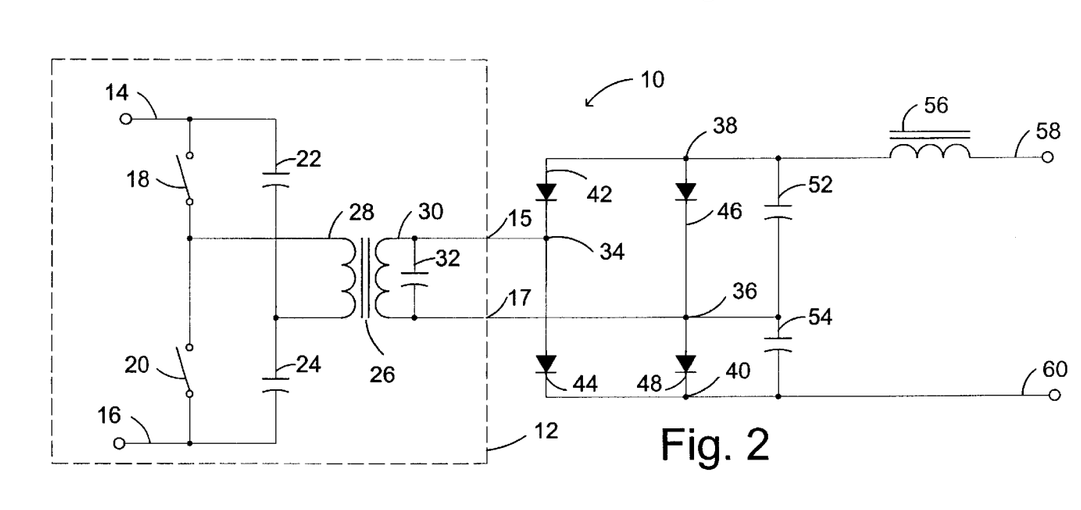
FIG. 2 illustrates a resonant converter circuit that incorporates the principles of this invention.

Now referring to FIG. 2 there is shown a single-phase voltage-doubler resonant converter dc power supply that incorporates the principles of this invention. The circuit configuration shown in FIG. 2 is very similar to that shown in FIG. 1 so many references to component parts will have the same reference numbers. Even though almost the same circuit components are used, a simple change in circuit topology has a profound effect on the output characteristics of the new circuit. FIG. 2 differs from FIG. 1 by the addition of just two capacitors, 52 and 54, to the full bridge rectifier. Capacitors 52 and 54 are connected in series between positive rectifier output terminal 38 and negative rectifier output terminal 40 of the bridge rectifier. The junction where capacitors 52 and 54 are connected together is also connected to bridge rectifier ac input terminal 36. These two capacitors are the only elements needed to change dc power supplies having conventional resonant converter topologies to a dc power supply having a wide range full power load range. The simplicity of this circuit design and the operating results achieved as described herein demonstrate the advantages that the power supply design of the instant application will have over prior art designs in use today.

Figure 10:
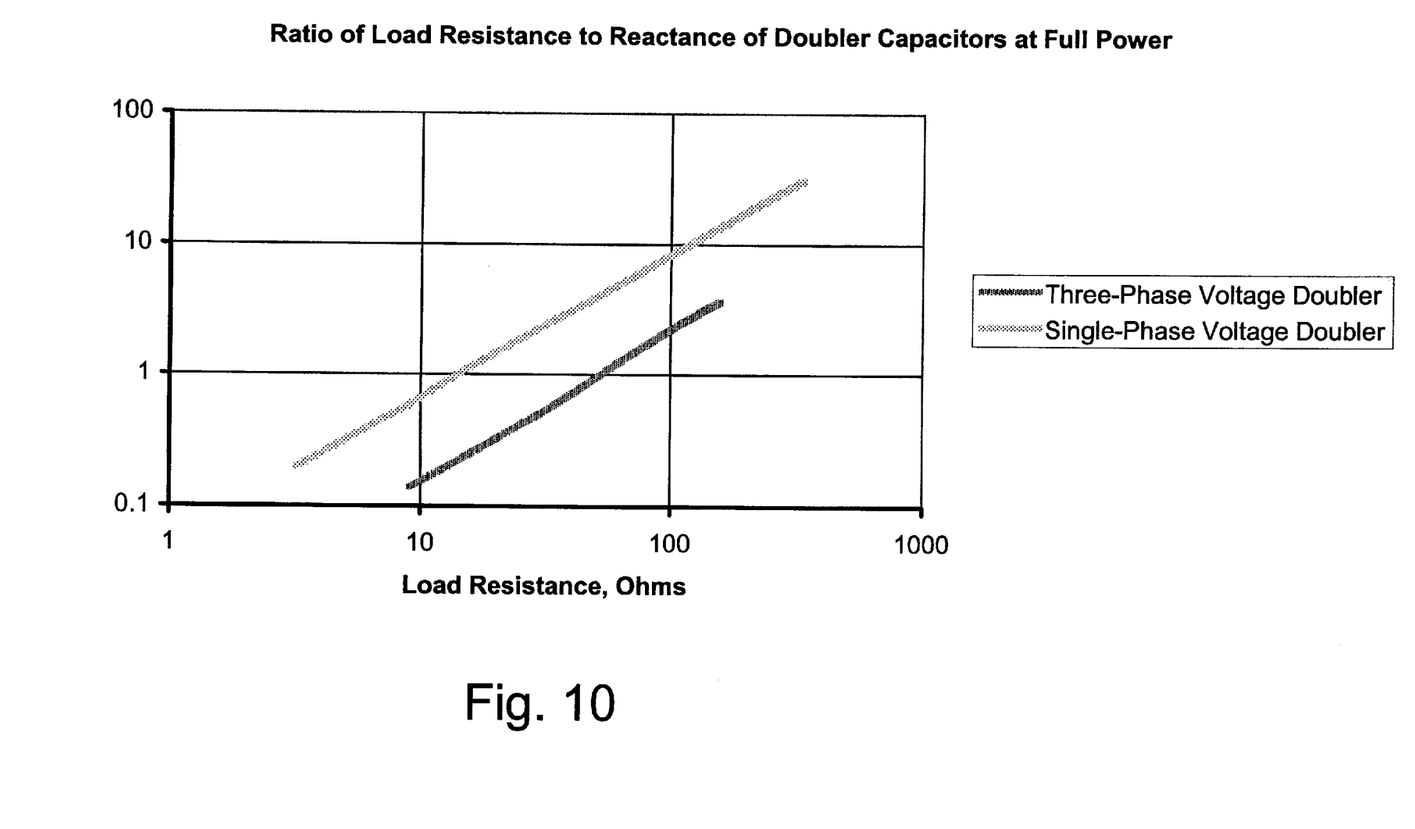
FIG. 10 illustrates a graph of a mathematical prediction of the ratio of load resistance to the reactance of the output capacitors at full power.

Capacitor 52 provides a capacitive reactance between rectifier ac input terminal 36 and positive rectifier output terminal 38, and capacitor 54 provides a capacitive reactance between rectifier ac input terminal 36 and negative rectifier output terminal 40. The values of capacitors 52 and 54 are selected so that the capacitive reactances are greater than the load resistance at the low end of the load impedance range, and less than the load resistance at the high end of the load impedance range. FIG. 10 illustrates a graph of a mathematical prediction of the ratio of load resistance to the reactance of the output capacitors at full power for the single-phase voltage doubler circuit of FIG. 2 and also for the three-phase voltage doubler circuit of FIG. 7 when the circuits have component values as specified in tables 1 and 3 respectively.

At the high end of the load impedance range, the voltage between terminals 38 and 40 has minimal ripple due to the filtering action of capacitors 52 and 54, and the voltage between load output terminals 58 and 60 approaches twice the value of the amplitude of the inverter output voltage.

At the low end of the load impedance range the rectifier output voltage between terminals 38 and 40 has substantial ripple, and may even drop to zero volts for a fraction of every half-cycle. The value of inductor 56 is selected to be large enough so that the ripple voltage between load output terminals 58 and 60 is acceptably low at the low end of the impedance range. The average value of the rectifier output voltage may be as low as 50 percent of the amplitude of the inverter output voltage. Consequently, the dc voltage between load output terminals 58 and 60 may be as low as half of the value of the amplitude of the inverter output voltage at the low end of the load impedance range.

Thus, it can be readily seen that doubling the output voltage with capacitors, or halving it with an inductive choke can extend the full power load impedance range by allowing the load voltage have up to a 4:1 range for a given amplitude of inverter output voltage. This corresponds to a 16:1 load impedance range at a given output power. With the L-C-C resonant converter providing a 4:1 impedance range, the total system impedance range becomes the product of the two for a total of 64:1 full-power impedance range.

The values of the resonant components of a single-phase voltage-doubler dc-dc converter capable of delivering 10 kW from a minimum dc supply voltage of 220V over an output voltage range of 200V to 1500 V are specified in Table 1. This corresponds to a full-power load resistance range of 4 ohms to 225 ohms. The ratio of the maximum full-power load resistance to the minimum full-power load resistance is 56.3, which is close to the theoretical full-power load impedance range of 64:1.

Inductor 56 may be omitted if cabling between the power supply and the load has sufficient inductance. Inductor 56 may also be omitted if a reduced load impedance range is acceptable.

TABLE 1

Component values for 10 kW Single-phase Voltage-Doubler Converter

| | | | |
|---|---|---|---|
| Series Capacitors 22, 24 | 240 nF | Primary Leakage inductance of Transformer 26 | 1.9 $\mu$H |
| Parallel Capacitor 32 | 40 nF | Primary Inductance of Transformer 26 | 20.8 $\mu$H |
| Capacitors 52, 54 | 50 nF | Secondary Inductance of Transformer 26 | 83.2 $\mu$H |
| Output inductor 56 | 15 $\mu$H | | |

Figure 4:
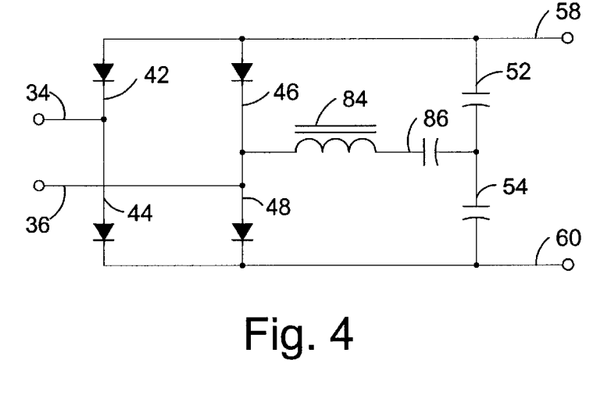
FIG. 4 illustrates a rectifier and output circuit for the converter of FIG. 2 that has a frequency selective network to achieve voltage doubling over a limited frequency range.

An alternate embodiment of the rectifier portions of a single-phase voltage-doubler resonant converter is shown in FIG. 4. Low output ripple may be achieved over the entire range of load impedances without inductor 56 if capacitors 52 and 54 are sufficiently large. In this case, the a wide load impedance range may be obtained by selectively enabling the doubling action by coupling the junction where capacitors 52 and 54 are connected together to rectifier ac input terminal 64 through a frequency-dependant impedance. In the embodiment of FIG. 4, the frequency-dependent impedance is an L-C filter consists of an inductor 84 and a capacitor 86 connected in series. The series L-C filter acts as a frequency selective switch in the region of the chosen L-C resonance causing frequency selective voltage doubling action in that frequency region alone. This allows the doubling action to be switched out over one or more desired operating frequency ranges even if the capacitive reactance of capacitors 52 and 54 is much less than the load resistance. The frequency ranges over which the doubling action occurs can be determined by selecting a suitable frequency-dependant impedance device such as a capacitor, an inductor or any combination of capacitors and inductors.

Figure 5:
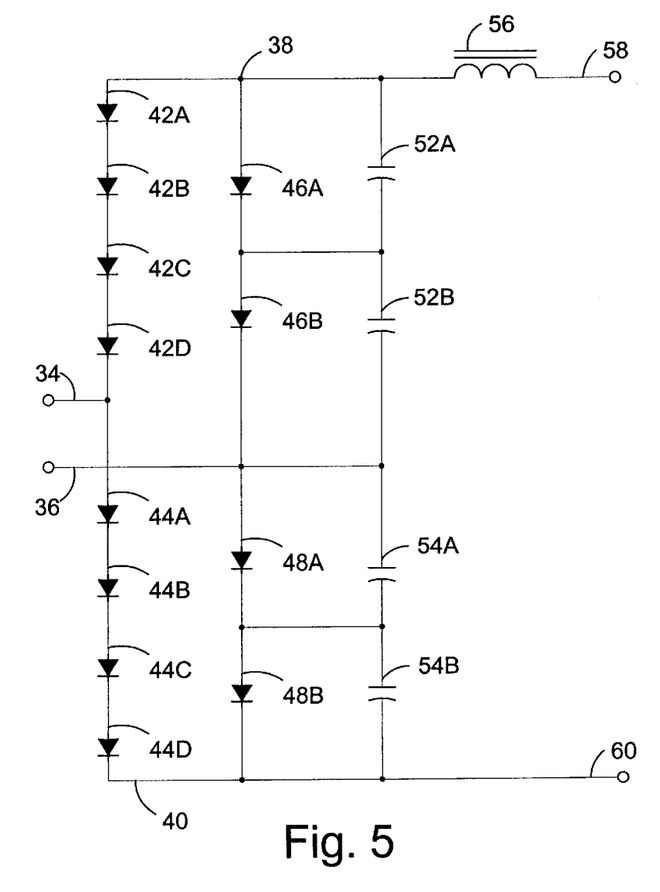
FIG. 5 illustrates an alternate embodiment of resonant converter circuit shown in FIG. 2 that incorporates the principles of this invention.

A third embodiment is shown in FIG. 5. It may be necessary to connect several diodes in series when the output voltages are larger that the breakdown voltage of available diodes. The diode 42 may be replaced with multiple series-connected diode elements such as 42A–42D. Similarly, capacitor 52 may be replaced with multiple series-connected capacitors 52A and 52B. The highest output voltages occur when the load impedance is high. Under these conditions, the capacitive reactances between rectifier ac input terminal 36 and rectifier output terminals is sufficiently low with respect to the load impedance that the magnitude of the voltages between terminal 36 and terminals 58 and 60 is approximately half of the voltage between terminals 58 and 60. Consequently, when the output voltage is highest, the maximum voltage between ac input terminal 36 and the rectifier output terminals is only slightly more than half of the voltage between the rectifier output terminals. In contrast, the maximum voltage between ac input terminal 38 and the rectifier output terminals is equal to the voltage between the rectifier output terminals. Thus, fewer diodes need to be included in the rectifier bridge legs connected to ac input terminal 36 than in the legs connected to terminal 34.

The lateral connections between series connected diodes and capacitors shown in FIG. 4 are optional. In addition to connecting multiple capacitors and/or diodes in series to accommodate large output voltages, multiple capacitors and/or diodes may be connected in parallel to accommodate large output currents.

Another important application of this invention is in multiphase DC-DC converters as taught in U.S. Pat. No. 5,535,906 issued to Geoffrey N. Drummond assigned to the assignee of the instant application. FIG. 6 illustrates a three-phase circuit that employs an L-C-C series resonant inverter having dc input terminals 96 and 98, and ac output terminals 138, 140 and 142. Alternative embodiments can be obtained with two phases operating in quadrature, or there may also be more than three phases. Switches 96–106 are configured in a conventional three-phase switching bridge. Capacitors 108, 110, and 112 are the series capacitors, while capacitors 132, 134, and 136 form the parallel capacitors in the L-C-C network. The series inductance is formed from the leakage inductances in the three transformers 114, 120, and 126. Output diodes 150–160 form a three-phase rectifier.

Table 2 specifies the values of the resonant components of a three-phase converter based on the simplified schematic diagram shown in FIG. 6. This converter is designed to deliver 10 kW from a minimum dc supply voltage of 220V over an output voltage range of 500V to 1000 V. This corresponds to a full-power load resistance range of 25 ohms to 100 ohms. The ratio of the maximum load resistance to the minimum load resistance is 4.

TABLE 2

Component values for 10 kW Three-phase Converter

| | | | |
|---|---|---|---|
| Series Capacitors 132, 134, and 136 | 200 nF | Primary Leakage inductance of Transformers 114, 120, and 126 | 5.3 $\mu$H |
| Parallel Capacitors 166–176 | 22 nF | Primary Inductance of Transformers 114, 120, and 126 | 44.2 $\mu$H |
| | | Secondary Inductance of Transformers 114, 120, and 126 | 307.2 $\mu$H |

Figure 7:
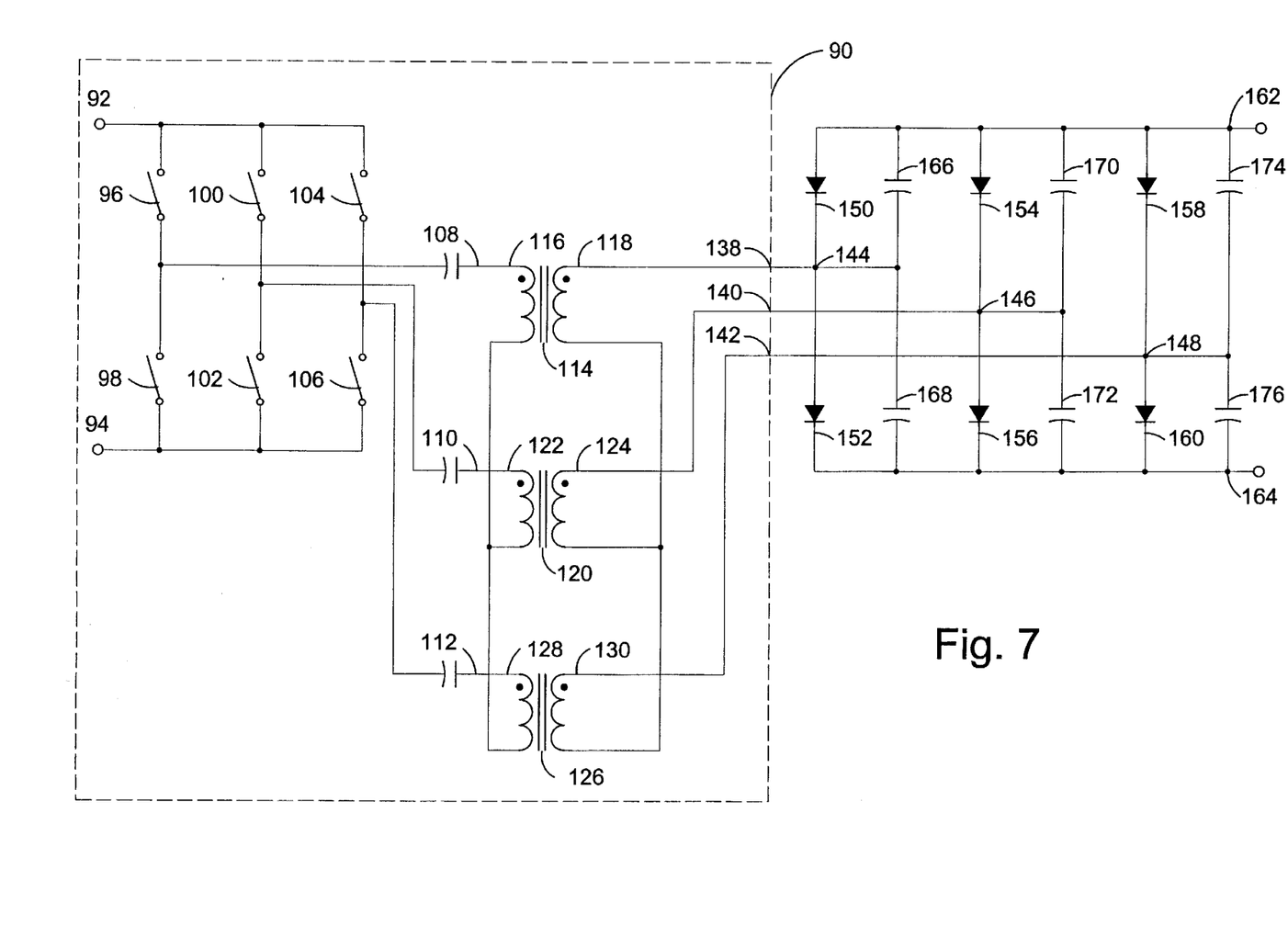
FIG. 7 illustrates a three-phase dc-dc power supply with a three-phase voltage-doubling rectifier.

Referring now to FIG. 7, the circuit of FIG. 6 is modified to form a three-phase voltage doubler by adding doubler capacitors 166–176 in parallel with diodes 150–160. Parallel capacitors 132, 134, and 136 in FIG. 6 are not required in the circuit of FIG. 7 because capacitors 166–176 provide the function of the parallel resonant capacitor as well as the voltage doubling function. Diodes 150–160 and capacitors 166–176 may be replaced with series and/or parallel combinations of individual elements.

As illustrated in FIG. 10, the values of doubler capacitors 166–176 are selected so that the capacitive reactances between the ac input terminals of the rectifier bridge and the dc terminals of the rectifier bridge are greater than the load resistance at the low end of the load impedance range, and less than the load resistance at the high end of the load impedance range.

The ripple voltage at the output terminals of the three-phase converter of FIG. 6 is approximately 5 percent, regardless of the load impedance. The ripple voltage at the output terminals of the three-phase converter of FIG. 7 is reduced to less than 5 percent by the doubler capacitors, and it decreases substantially as the load impedance increases.

Table 3 specifies the values of the resonant components of a three-phase voltage-doubler converter based on the simplified schematic diagram shown in FIG. 7. This converter is designed to deliver 10 kW from a minimum dc supply voltage of 220V over an output voltage range of 360V to 1100 V. This corresponds to a full-power load resistance range of 13 ohms to 121 ohms. The ratio of the maximum load resistance to the minimum load resistance is 9.3.

For low load impedances, the dc output voltage of the three-phase converter of FIG. 6 is approximately 156 percent of the amplitude of fundamental component of the ac voltage across the transformer secondary windings. For high load impedances, the dc output voltage is approximately 165 percent of the amplitude of fundamental component of the ac voltage across the transformer secondary windings.

For low load impedances, the dc output voltage of the three-phase voltage-doubler converter of FIG. 7 is approximately 152 percent of the amplitude of fundamental component of the ac voltage across the transformer secondary windings. For high load impedances, the dc output voltage is approximately 200 percent of the amplitude of fundamental component of the ac voltage across the transformer secondary windings. This increased range in the dc output voltage of the three-phase voltage-doubler converter is what allows this converter to achieve an increased full-load output impedance range.

TABLE 3

Component values for 10 kW Three-phase Voltage-Doubler Converter

| | | | |
|---|---|---|---|
| Series Capacitors 132, 134, and 136 | 200 nF | Primary Leakage inductance of Transformers 114, 120, and 126 | 5.2 µH |
| Capacitors 166–176 | 12.7 nF | Primary Inductance of Transformers 114, 120, and 126 | 43.0 µH |
| | | Secondary Inductance of Transformers 114, 120, and 126 | 172.0 µH |

The component values of the single-phase voltage doubler converter in Table 1 are values from a working converter. The minimum operating frequency is about 200 kHz. The converters of FIGS. 6 and 7 that have been built and tested were designed to operate with a minimum frequency of about 100 kHz. In order to enable a more accurate comparison of the different circuit topologies, the component values of Tables 2 and 3 are calculated values based on a mathematical model of converters having a minimum operating frequency of about 200 kHz.

Figure 8:
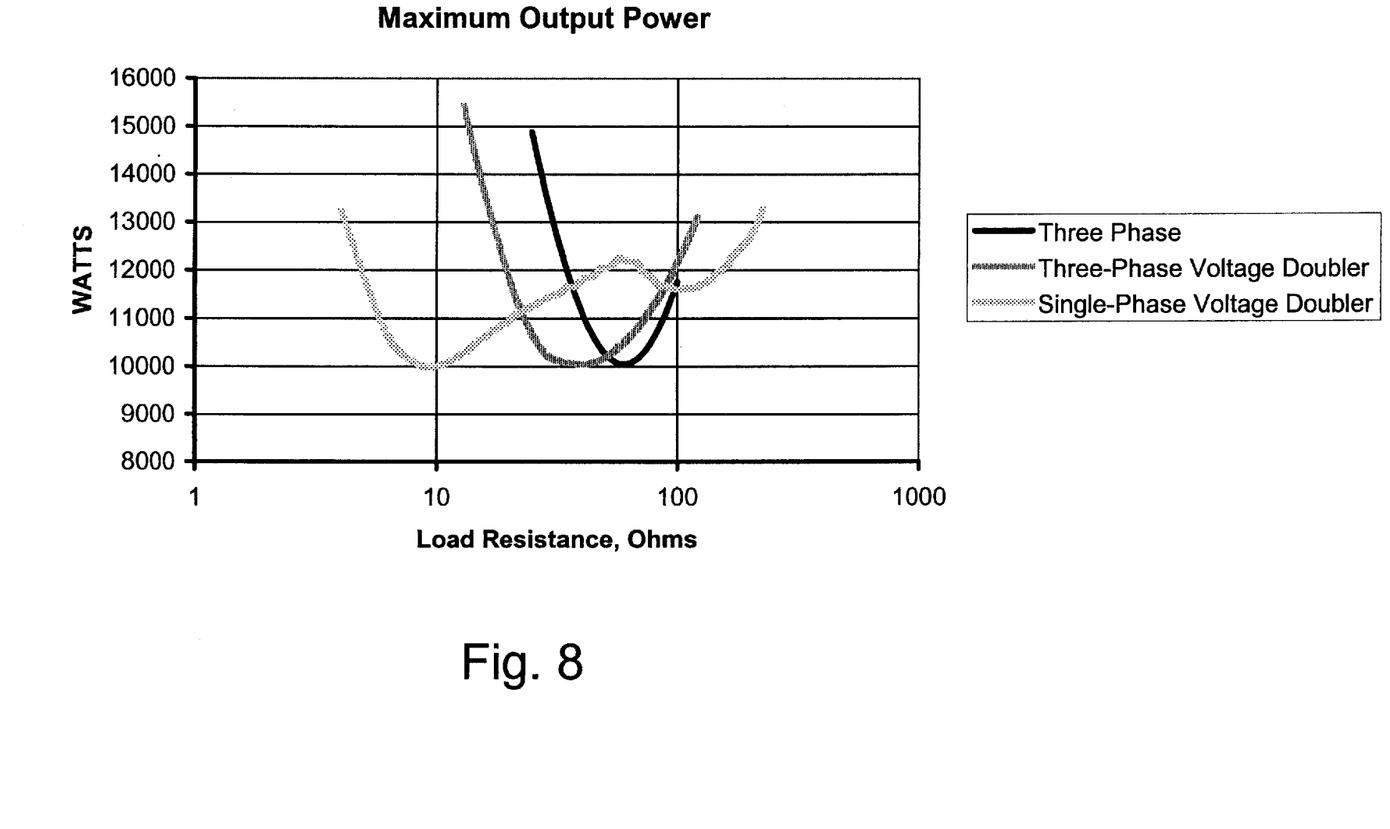
FIG. 8 illustrates a graph that shows a mathematical prediction of the maximum available output power as a function of load resistance for three types of power converters having component values as specified in Tables 1, 2 and 3.

FIG. 8 shows mathematical predictions of the maximum available output power as a function of load resistance for the 10 kW three-phase inverter, the 10 kW three-phase voltage-doubler converter, and the 10 kW single-phase voltage-doubler converter as specified in Tables 1, 2, and 3. The prior-art three-phase inverter has the narrowest range of full-power load resistances. The three-phase voltage-doubler converter has a wider range of load resistances, and the single-phase voltage-doubler converter has the widest range of load resistances.

Figure 9:
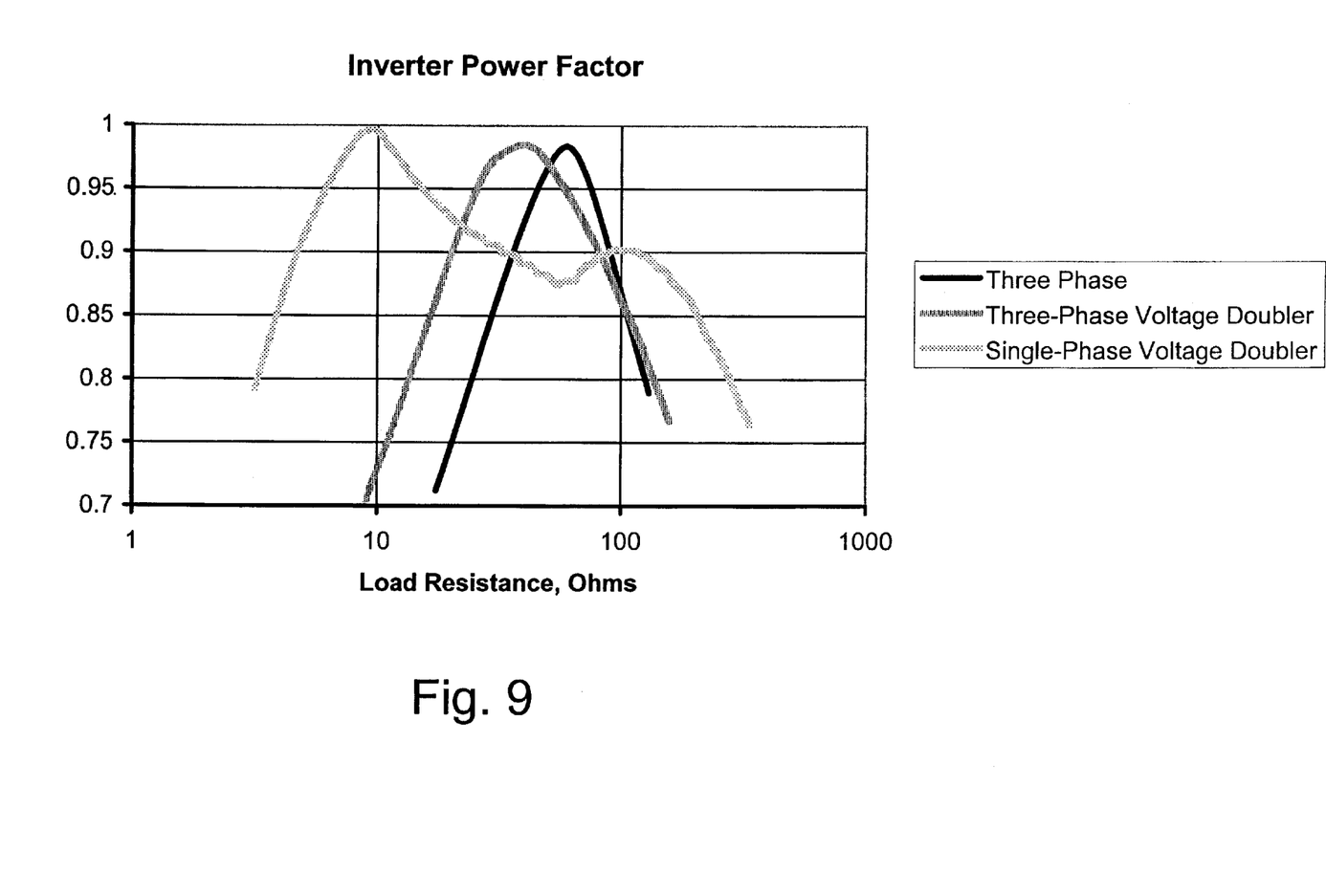
FIG. 9 illustrates a graph that shows a mathematical prediction of the inverter power factor power as a function of load resistance for three types of power converters having component values as specified in Tables 1, 2 and 3.

FIG. 9 is a graph that shows a mathematical prediction of the inverter power factor power at 10 kW output power as a function of load resistance for the 10 kW three-phase inverter, the 10 kW three-phase voltage-doubler converter, and the 10 kW single-phase voltage-doubler converter as specified in Tables 1, 2, and 3. The prior-art three-phase inverter has the narrowest range over which the power factor is high enough that the losses are acceptably low. The three-phase voltage-doubler converter has a wider range of high power factor, and the single-phase voltage-doubler converter has the widest range of high power factor.

The output terminals of more than one converter consisting of an inverter and a rectifier in accordance with the present invention may be connected in parallel to form power supplies that deliver increase output power. The timing of the inverter switches of the parallel-connected converters can be interleaved to reduce ripple in the output voltage.

Although there is illustrated and described specific structure and details of operation, it is clearly understood that the same were merely for purposes of illustration and that changes and modifications may be readily made therein by those skilled in the art without departing from the spirit and the scope of this invention.

What we claim is:

1. A dc power supply for supplying dc current to a load having a resistance within a predetermined load resistance range, comprising:

a) input terminals connected to a source of dc power;
   b) an inverter circuit for converting the dc input voltage into an alternating voltage of a predetermined high frequency that is coupled to a rectifying bridge circuit for converting the alternating voltage to a dc output voltage;
   c) the rectifying bridge circuit comprising first and second rectifier ac input terminals coupled to the inverter circuit, a positive rectifier output terminal and a negative rectifier output terminal, and a plurality of rectifiers connected in series between the positive and negative rectifier output terminals;
   d) a plurality of capacitors connected in series between the positive and negative rectifier output terminals,
   e) a junction of a pair of the rectifiers and a junction of a pair of the capacitors connected to each other and to the second rectifier ac input terminal such that the capacitors provide a capacitive reactance at the predetermined frequency between the second rectifier ac input terminal and the positive and negative rectifier output terminals; and
   f) a positive load output terminal coupled to the positive rectifier output terminals, and a negative load output terminal coupled to the negative rectifier output terminal.

2. A dc power supply for supplying dc current to a load having a resistance within a predetermined load resistance range as recited in claim 1 wherein each rectifier is comprised of at least one diode.

3. A dc power supply as recited in claim 2 wherein:

the capacitors have values such that
   a) when the load resistance is relatively low with respect to the predetermined load resistance range, the capacitive reactance at the predetermined frequency is high relative to the load resistance and
   b) when the load resistance is relatively high with respect to the predetermined load resistance range, the capacitive reactance at the predetermined frequency is low relative to the load resistance and the dc output voltage is greater than the amplitude of the alternating voltage.

4. A dc power supply as recited in claim 3 further comprising an inductor connected between a rectifier output terminal and a load output terminal such that when the load resistance is relatively low with respect to the predetermined range, the dc output voltage is less than the amplitude of the alternating voltage wherein the predetermined load resistance range is wider.

5. A dc power supply for supplying dc current to a load having a resistance within a predetermined load resistance range, comprising:

a) input terminals connected to a source of dc power:
   b) an inverter circuit for converting the dc input voltage into an alternating voltage of a predetermined high frequency that is coupled to a rectifying bridge circuit for converting the alternating voltage to a dc output voltage:
   c) the rectifying bridge circuit comprising first and second rectifier ac input terminals, a positive rectifier output terminal and a negative rectifier output terminal, and a plurality of rectifiers connected in series between the positive and negative rectifier output terminals;
   d) a pair of capacitors connected in series between the positive and negative rectifier output terminals,
   e) frequency dependant impedance means for coupling a junction of the pair of capacitors to the second rectifier ac input terminal wherein the frequency dependant impedance means has a relatively low impedance over a first range of frequencies such that the capacitors provide a capacitive reactance between the second rectifier ac input terminal and each rectifier output terminal when the predetermined frequency is within the first frequency range;

f) a positive load output terminal coupled to the positive rectifier output terminal, and a negative load output terminal coupled to the negative rectifier output terminal.

6. A dc power supply as recited in claim 5 wherein each rectifier is comprised of at least one diode.

7. A dc power supply as recited in claim 6 wherein:
when the predetermined frequency is within the first range of frequencies and the load resistance is relatively high with respect to the predetermined load resistance range the dc output voltage is greater than the amplitude of the alternating voltage.

8. A dc power supply as recited in claim 7 wherein the frequency dependant impedance means for coupling a junction of the pair of capacitors to the second rectifier ac input terminal is a series connected inductor and capacitor.

9. A dc power supply, for supplying dc current to a load having a resistance within a predetermined load resistance range, comprising:
   a) a multi-phase inverter circuit for converting a dc input voltage into alternating voltages of multiple phases at a predetermined high frequency that is coupled to a rectifying bridge circuit for converting the alternating voltages to a dc output voltage;
   b) the rectifying bridge circuit comprising a rectifier ac input terminal for each phase of the alternating voltage, a positive and a negative rectifier output terminal between which is connected a plurality of rectifiers connected in series;
   c) a pair of capacitors connected in series between each positive and negative rectifier output terminals for each phase;
   d) each rectifier ac input terminal is connected to a junction of the pair of capacitors wherein the capacitors provide a capacitive reactance at the predetermined frequency between each rectifier ac input terminal and each rectifier output terminal; and
   e) a positive load output terminal coupled to the positive rectifier output terminal, and a negative load output terminal coupled to the negative rectifier output terminal.

10. A dc power supply for supplying dc current to a load having a resistance within a predetermined load resistance range as recited in claim 9 wherein each rectifier is comprised of at least one diode.

11. A dc power supply as recited in claim 10 wherein:
the capacitors have values such that
   a) when the load resistance is relatively low with respect to the predetermined load resistance range, the capacitive reactance at the predetermined frequency is high relative to the load resistance, and
   b) when the load resistance is relatively high with respect to the predetermined load resistance range, the capacitive reactance at the predetermined frequency is low relative to the load resistance and the dc output voltage is greater than the amplitude of a voltage between two rectifier ac input terminals.

* * * * *